July 14, 1964

C. F. HENDERSON 3,140,800

DISPENSER FOR GRANULAR MATERIALS

Filed Feb. 21, 1962

INVENTOR
CHARLES F. HENDERSON

BY
R. Hoffman
W. Bier
ATTORNEYS

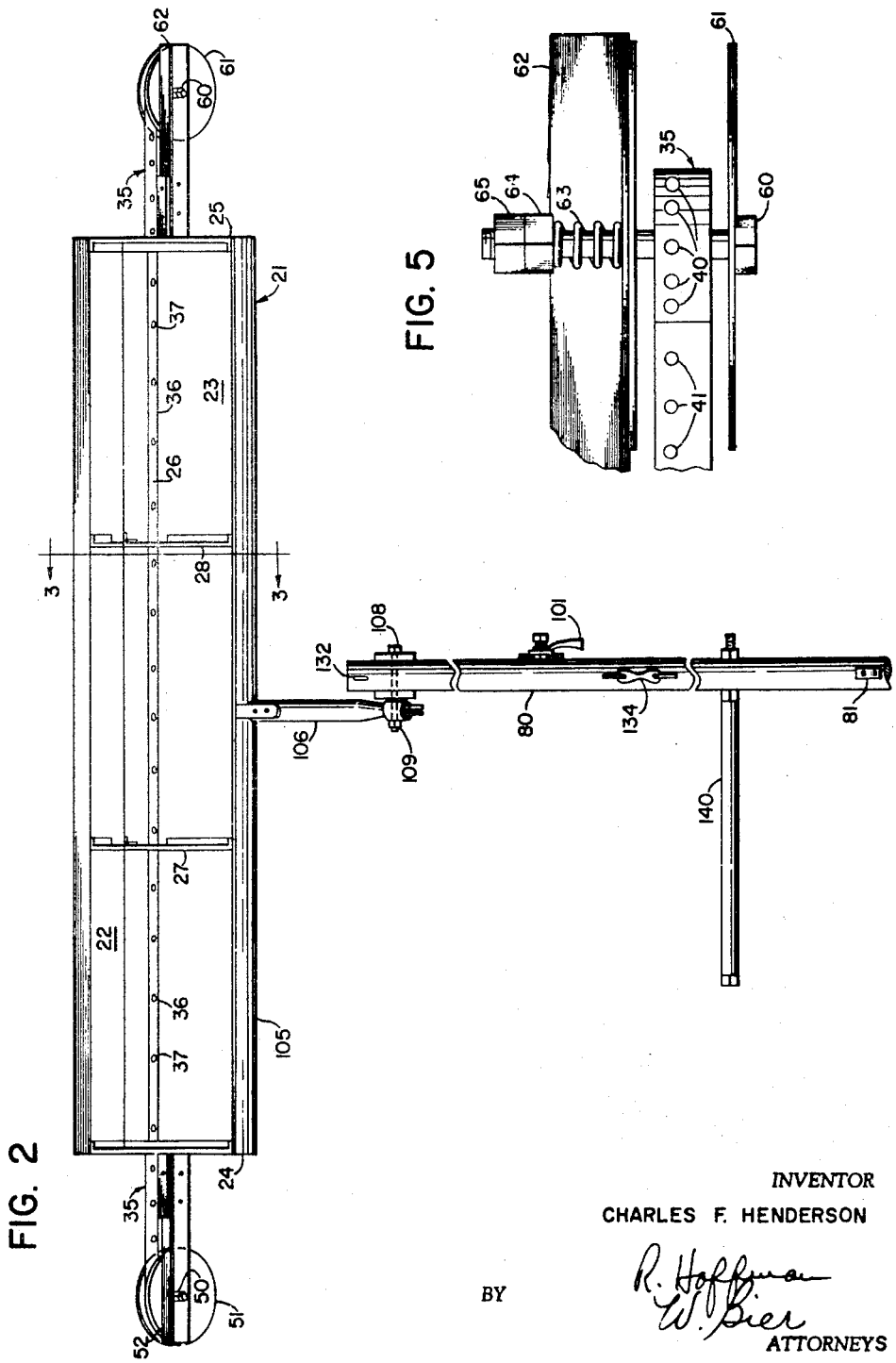

July 14, 1964
C. F. HENDERSON
3,140,800
DISPENSER FOR GRANULAR MATERIALS
Filed Feb. 21, 1962
5 Sheets-Sheet 3
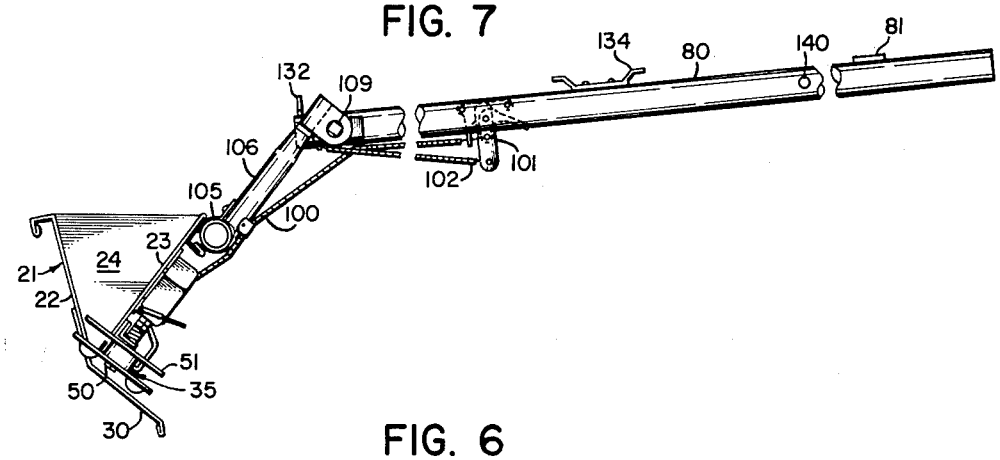
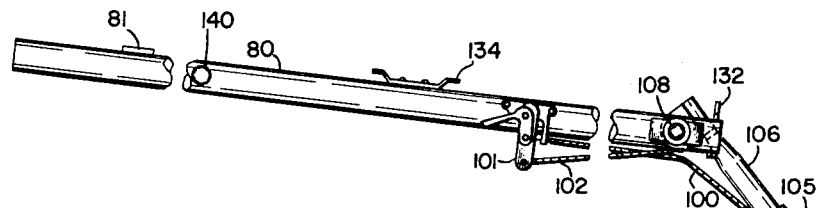
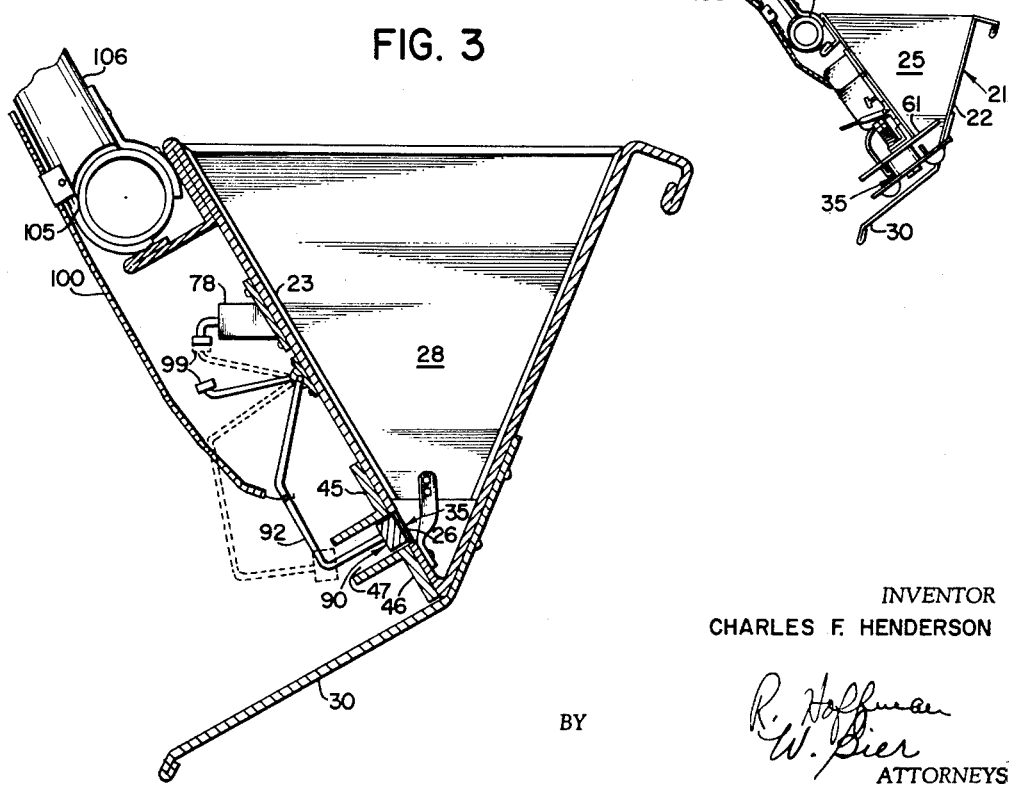
INVENTOR
CHARLES F. HENDERSON
BY
ATTORNEYS July 14, 1964     C. F. HENDERSON     3,140,800
DISPENSER FOR GRANULAR MATERIALS Filed Feb. 21, 1962     5 Sheets-Sheet 4

INVENTOR
CHARLES F. HENDERSON

BY
ATTORNEYS

July 14, 1964  C. F. HENDERSON  3,140,800
DISPENSER FOR GRANULAR MATERIALS
Filed Feb. 21, 1962 5 Sheets-Sheet 5
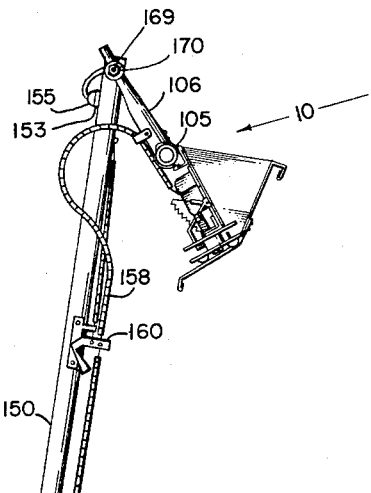
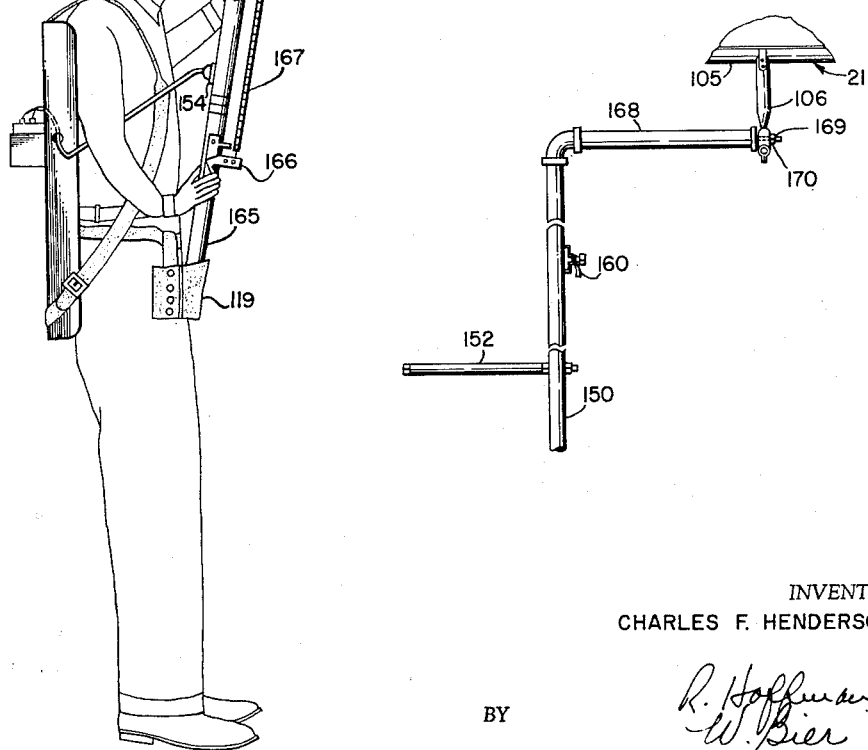
INVENTOR
CHARLES F. HENDERSON
BY
ATTORNEYS

United States Patent Office 3,140,800
Patented July 14, 1964

3,140,800
DISPENSER FOR GRANULAR MATERIALS
Charles F. Henderson, Stillwater, Okla., assignor to the United States of America as represented by the Secretary of Agriculture
Filed Feb. 21, 1962, Ser. No. 174,921
3 Claims. (Cl. 222—174)
(Granted under Title 35, U.S. Code (1952), sec. 266)

A non-exclusive, irrevocable, royalty-free license in the invention herein described throughout the world for all purposes of the United States Government, with the power to grant sublicenses for such purposes, is hereby granted to the Government of the United States of America.

This invention relates, in general, to a device for dispensing granular material. The invention relates, in particular, to such a device for dispensing measured quantities of agricultural granular materials, such as insecticides, herbicides, and fertilizers, at a desired height relative to growing vegetation, as, for example, to low- and high-growing crops, and has among its objects the provision of such a device which is capable of metering out regulated and accurate dosages of the granular material, is capable of confining the application of the granular dosages to definite swaths, is maneuverable in small, replicated areas, and is capable of treating high-growing crops, such as corn and sugar cane 10 to 12 feet in height, or higher, thus simulating airplane application. Other objects will be apparent from the description of the invention.

In general, the dispenser comprises a feed hopper adapted to receive the granular material and having a discharge port. A tape movable in line with the discharge port contains perforations, preferably equal size perforations of varying spacings, for dispensing the granular material at desired varying rates therethrough, means also being provided for linearly moving the tape relative to the discharge port so as to line up the port with desired perforations. Additional means is included for vibrating the hopper to dispense the granular material through the desired perforations.

The dispenser is particularly useful for applying agricultural granular materials, such as insecticides, herbicides, fertilizers, etc., to low-growing vegetation and especially to high-growing vegetation such as corn and sugar cane. It includes the above-described feed hopper, means for continuously dispensing the granular material through the discharge port, as exemplified by the said perforated tape, the said means for moving the tape relative to the discharge port, and the said means for vibrating the hopper, and includes, in addition, a harness adapted to be worn by an operator, and means for adjustably supporting the hopper on the harness for varying the height of the hopper relative to the vegetation.

In the accompanying drawing

FIG. 2 is a plan view of the feed hopper looking in the direction of the arrow 2 of FIG. 1;

FIG. 3 is a cross section, on an enlarged scale, on the line 3—3 of FIG. 2;

FIG. 5 is a view on an enlarged scale of a detail of the right hand spool shown in FIG. 4, as will be explained in greater detail below;

FIG. 6 is a side elevation corresponding to that of FIG. 1 illustrating a portion of the dispensing device in somewhat greater detail;

FIG. 7 is an elevation of the side opposite to that illustrated in FIG. 6;

Figure 1:
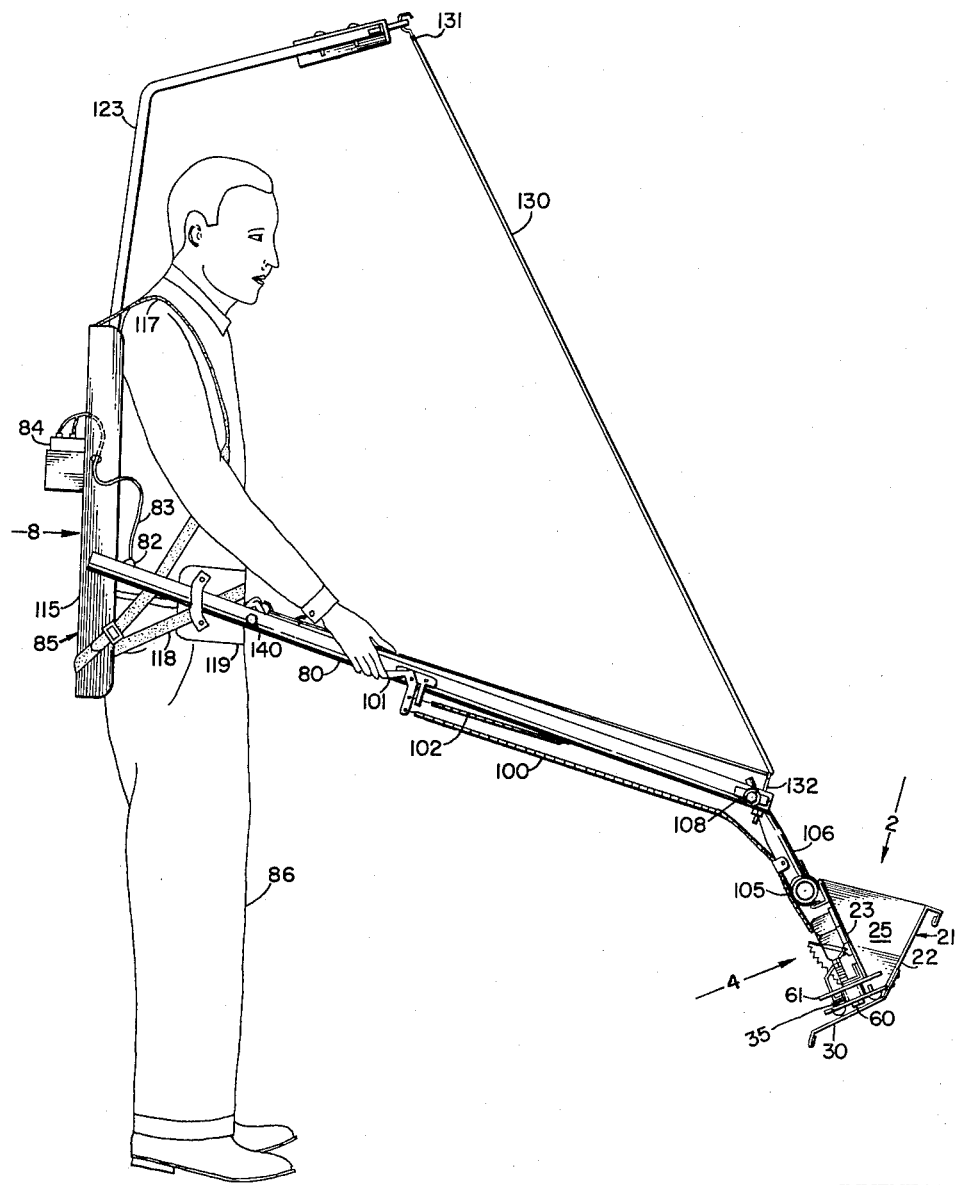
FIG. 1 is a side elevation of the dispensing device illustrating an operator wearing the harness on which the feed hopper is supported at a height for application of an agricultural granular material to low-growing vegetation.

FIG. 9 is a side elevation of the dispensing device illustrating an operator wearing the harness on which the feed hopper is supported at a height for application of an agricultural granular material to high-growing vegetation; and FIG. 10 is a view, partially broken away, of the feed hopper looking in the direction of the arrow 10 of FIG. 9, as used for treating row crops including high-growing vegetation.

Referring with particularity to the drawing, the dispensing device is provided with a feed hopper 21, adapted to receive granular material, and composed of front panel 22, back panel 23, and end panels 24 and 25, constructed of metal. A slot 26 serves as a discharge port of the hopper through which the granular material is dispensed, and extends longitudinally in back panel 23 near the bottom of the hopper. Braces 27 and 28, mounted between said front and back panels, reinforce the hopper.

Means is also provided for continuously dispensing the granular material when placed within the hopper, through slot 26 and on to spreader 30 for even distribution over the swath to which applied. Such means include a tape 35 adapted to be moved in line with slot 26 and containing equal size perforations of varying spacings for dispensing the granular material at desired varying rates therethrough. For example, as shown in FIGS. 2 and 5, the tape is divided into sections, each section being of a length corresponding to the length of slot 26 and containing a series of spaced identical perforations, each series of perforations, in turn, being of gradually increasing spacing. A complete section 36 of the same perforations 37 is illustrated in FIG. 2, while portions of two sections with differently spaced perforations 40 and 41, respectively, are illustrated in FIG. 5.

Means is also included for moving the tape relative to slot 26 so as to line up sections of the tape containing the desired perforations with the slot. Such means includes brackets 45 and 46 which are both fixed to the rear surface of back panel 23, bracket 45 being positioned above, extending the full length of, and being parallel to, slot 26, while bracket 46 is positioned below, also extending the full length of, and also being parallel to, slot 26. This positioning of brackets 45 and 46 above and below slot 26 forms a longitudinal channel 47 directly over the slot 26 which is adapted to receive the tape and through which the tape is adapted to move in close proximity to the slot.

One end of the tape is fixed to a spindle 50 of a spool 51, the spool, in turn, being mounted on an extension 52 of bracket 45 through the medium of a compression spring 53 which encircles the end of spindle 50 and which is kept taut against extension 52 by locknuts 54 and 55. This structure enables spool 51 to butt tightly against extension 52 thereby exerting a frictional braking action against undesired movement of the spool. Spool 51 is also provided with ears 56 and 57 which may be grasped by the hand and turned thereby to rotate spindle 50 to move the tape in line with slot 26 to a selected section of desired perforations.

The other end of the tape is similarly fixed to a spindle 60 of a spool 61, which, in turn, is mounted and positioned in a manner similar to that of spool 51 except that spool 61 is adapted to rotate in a direction opposite to that of spool 51. Thus spool 61 is mounted on an extension 62 of bracket 45 through the medium of a compression spring 63 and locknuts 64 and 65, and is provided with ears 66 and 67 for rotating spindle 60.

Means is further provided for vibrating the hopper containing the granular material. Such means include vibrators, such as are exemplified by conventional electric doorbell knockers 71, 72, and 73, having clappers 74, 75 and 76, respectively. The vibrators are mounted on the rear surface of back and panel 23 above bracket 45 with the clappers poised to strike the bracket 45.

Figure 4:
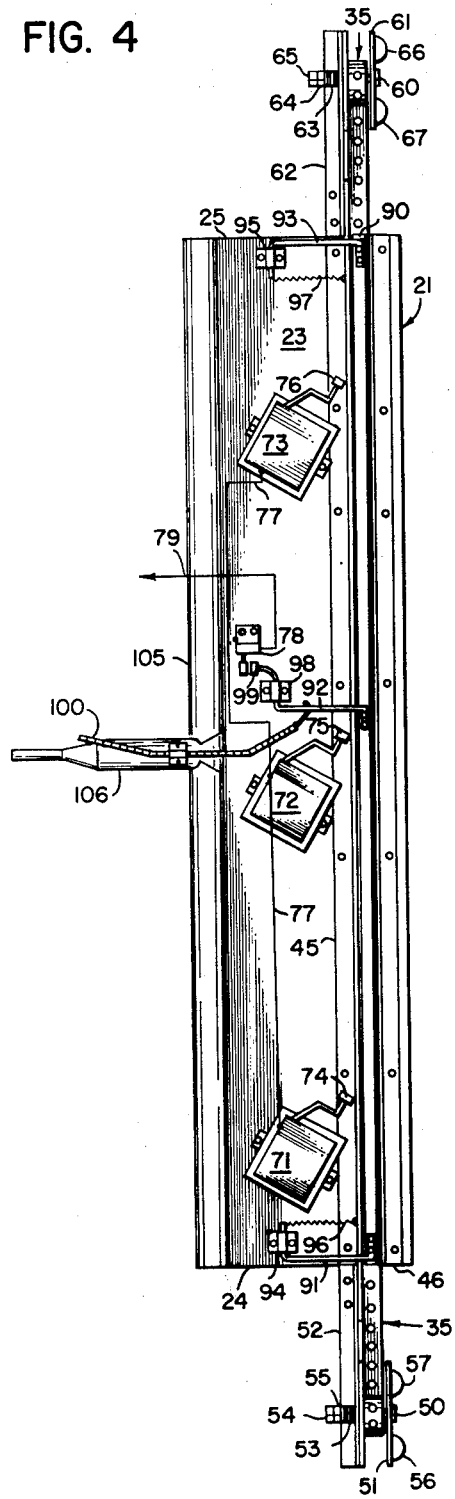
FIG. 4 is a view of the feed hopper looking in the direction of the arrow 4 of FIG. 1.
Figure 8:
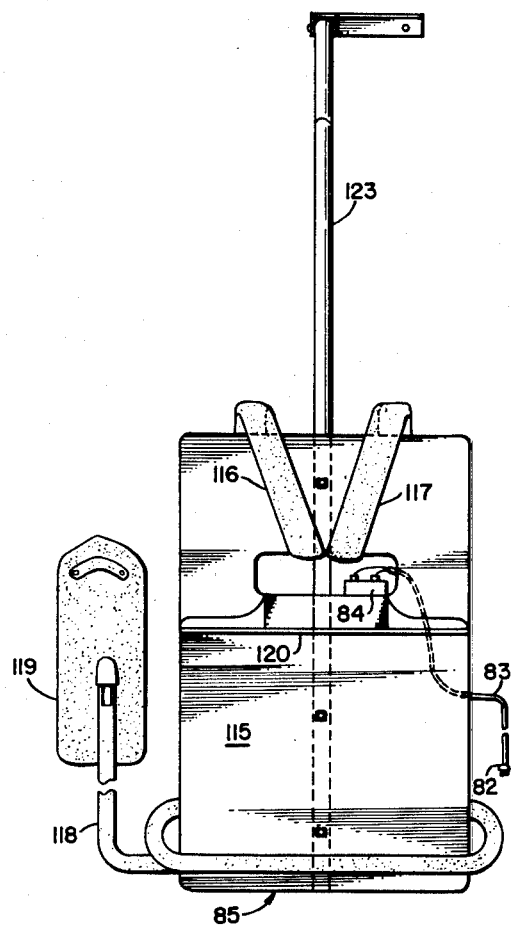
FIG. 8 is a view of the harness looking in the direction of the arrow 8 of FIG. 1.

The vibrators are connected in parallel, one terminal of each of which is grounded to metallic back panel 23, and the other terminal of each of which is connected through conductor 77, switch 78, conductor 79 leading through a hollow metallic pole 80 to one terminal of an outlet 81 in said pole, through one prong of a plug 82, and through one conductor of a cable 83 to one terminal of a battery 84, carried by a harness 85, worn by an operator 86, thus completing one leg of the circuit. The end of conductor 79, indicated by the arrow in FIG. 4, is detachably connected to an intermediate conductor (not shown) leading to the first terminal of outlet 81. The circuit is completed by the second conductor of cable 83 connecting the second terminal of the battery with the second prong of plug 82 and thence to the second terminal of outlet 81 in pole 80 which is directly grounded to the pole. When the switch 78 is activated to close the vibrator circuit, the clappers strike the bracket 45 to vibrate the hopper causing the granular material to be dispensed through the perforations.

Means is also included for controlling the flow of the granular material through the perforations. Such means include a gate 90 adapted to be closed, that is, to cover the perforations so as to prevent the flow of the granular material therethrough when not being dispensed, and also adapted to be opened, that is, lifted away from the perforations so as to permit the flow of the granular material therethrough. When the granular material is not being dispensed, the gate is positioned in channel 47 over the tape, as shown in FIGS. 3 and 4, and is maintained in such closed position by levers 91, 92, and 93. One end of each of levers 91 and 93 is fixed to gate 90, the approximate middle position of each of these levers is pivoted to the rear surface of back panel 23 at 94 and 95, respectively, and the other end of each of these levers is attached to bracket 45 by means of tension springs 96 and 97, respectively, which serve to automatically close the gate. Lever 92 also has one end fixed to gate 90 and also its approximate middle portion pivoted to the rear surface of back panel 23 at 98; however, its other end carries a button 99 adapted to close switch 78, when the gate is opened. Lever 92, furthermore, is connected to a pullwire 100, attached to a trigger 101 adapted to be pulled by the operator to open gate 90 and simultaneously close the switch to complete the vibrator circuit. A tension spring 102 supplements springs 96 and 97.

A strengthening tube 105 is fixed on the back panel 23 and a bar 106, normal to the tube, has one of its ends fixed thereto. The other free end of bar 106 is pivotally mounted to pole 80 on pivot bolt 108. Locknut 109 locks the pole to the bar in the desired pivotal position.

The hopper is supported by the harness 85 of conventional type which includes a backing 115. This backing is worn by the operator through the medium of straps 116 and 117, belt 118, and waistband 119. The rear side of the backing is provided with a shelf 120 for carrying battery 84. The rear side of the backing also carries a weight (not shown) for counterbalancing the hopper as it is carried by the operator. The backing also carries a curved rod 123 rigidly secured at one of its ends to the backing.

A rope 130 supports the hopper. One end of the rope is attached to hook 131, which, in turn, is hooked to the free end of rod 123. The other end of the rope passes through an eyelet 132 fixed near the inlet end of pole 80 and is wound around a cleat 134, mounted on pole 80, positioned convenient to the operator for varying the height of the hopper relative to the vegetation.

A handle 140 positioned near the outlet end of pole 80 extends in front of and across the body of the operator and is held by him in his left hand as an aid to supporting the hopper in a level position while carrying it.

To operate the dispensing device for broadcasting over low-growing vegetation, the tape is adjusted to the desired perforations, the hopper is pivotally mounted on the pole in the desired position, and then supported in the harness at the desired height as depicted in FIG. 1. The trigger is thereafter pulled by the operator whereupon the pullwire opens the gate and simultaneously closes the switch completing the vibrator circuit and activating the clappers which thereupon vibrate the hopper and dispense the granular material through the perforations.

When the granular material is to be applied to row crops including high-growing vegetation such as corn and sugar cane, a different arrangement, as illustrated in FIG. 9, is employed for carrying and operating the hopper, the latter being identical with that employed for application of the granular material to low-growing vegetation.

For application to row crops including high-growing vegetation, a long, hollow pole 150, similar to 80 but having a right-angle extension 168 of the same tubular material terminating in a pivot bolt 169 to which the free end of bar 106 is pivotally mounted, is substituted for pole 80. Locknut 170 locks the pole to the bar at the desired pivotal position. Pole 150 also carries a handle 152 which corresponds to handle 140 of pole 80, that is, is substantially identical thereto in structure and function.

Pole 150 is further provided with an electric outlet 153 near its inlet end and an outlet 154 near its outlet end, the latter outlet corresponding to outlet 81 of pole 80. The positioning of outlet 153 provides a convenient intermediate point for completing the vibrator circuit by use of a conventional electric plug 155. To accomplish this, the free end of conductor 79, indicated by an arrow in FIG. 4, is connected to one terminal of outlet 153, through one prong of plug 155, through a conductor (not shown) connected to the second prong of the plug, then to the second terminal of outlet 153, and then by another conductor (not shown) within pole 150 to one terminal of outlet 154. The remainder of the vibrator circuit is the same as for the device used for application to low-growing vegetation.

Pole 150 is further provided with a pullwire 158, corresponding to pullwire 100, one end of which is attached to lever 92 while its other end is atached to a trigger 160, corresponding to trigger 101. When trigger 160 is pulled, pullwire 158 opens gate 90 and simultaneously closes switch 78 to complete the vibrator circuit.

For even taller crops, an extension 165, having a trigger 166, may be attached to the outlet end of pole 150, and the trigger 166 connected to trigger 160 by a pullwire 167 so that the two triggers 160 and 166 work together, when pulled, to open gate 90.

To operate the dispenser for high-growing vegetation, the tape is adjusted to the desired perforations, the hopper is pivotally mounted on extension 168 attached to pole 150, and then supported in the waistband 119 of the harness, fashioned in the form of a pocket as shown in FIG. 9, at the desired height. Trigger 160 (or trigger 166 if the latter is in use) is then pulled by the operator whereupon pullwire 158 (or together with pullwire 167 if the latter is in use) opens the gate 90 and simultaneously closes the switch 78 completing the vibrator circuit and activating the clappers which thereupon vibrate the hopper and dispense the granular material through the perforations.

What is claimed is:

1. A device for dispensing granular material comprising a feed hopper adapted to receive the granular material and having a discharge port, a tape mounted on the feed hopper, said tape being divided into sections, each section being of a length corresponding to the length of said discharge port and containing a series of spaced identical perforations, each series of perforations, in turn, varying in spacings from each of the other series, said tape being adapted to be moved in line with said discharge port for dispensing the granular material through said perforations at desired varying rates therethrough, means for linearly moving the tape relative to the discharge port so as to line up the port with desired perforations, and means for vibrating the hopper containing the granular material to dispense the granular material through the desired perforations.

2. A device for dispensing an agricultural granular material to low- and high-growing vegetation comprising a feed hopper adapted to receive the granular material and having a discharge port, a tape mounted on the feed hopper, said tape being divided into sections, each section being of a length corresponding to the length of said discharge port and containing a series of spaced identical perforations, each series of perforations, in turn, varying in spacings from each of the other series, said tape being adapted to be moved in line with said discharge port for dispensing the granular material through said perforations at desired varying rates therethrough, means for linearly moving the tape relative to the discharge port so as to line up the port with desired perforations, means for vibrating the hopper containing the granular material to dispense the granular material through the desired perforations, a harness adapted to be worn by an operator, and means for supporting the hopper on the harness for varying the height of the hopper relative to the vegetation.

3. A device for dispensing an agricultural granular material to low- and high-growing vegetation comprising a feed hopper adapted to receive the granular material and having a discharge port, a tape mounted on the feed hopper, said tape being divided into sections, each section being of a length corresponding to the length of said discharge port and containing a series of spaced identical perforations, each series of perforations, in turn, varying in spacings from each of the other series, said tape being adapted to be moved in line with said discharge port for dispensing the granular material through said perforations at desired varying rates therethrough, means for linearly moving the tape relative to the discharge port so as to line up the port with desired perforations, means for vibrating the hopper containing the granular material to dispense the granular material through the desired perforations, a gate for controlling the flow of the granular material through the perforations, means for simultaneously opening the gate and energizing said vibrating means to vibrate the hopper, a harness adpted to be worn by an operator, and means for supporting the hopper on the harness for varying the height of the hopper relative to the vegetation.

References Cited in the file of this patent

UNITED STATES PATENTS

| | | |
|---|---|---|
| 947,025 | Pearl et al. | Jan. 18, 1910 |
| 1,124,523 | Reeser | Jan. 12, 1915 |
| 2,296,563 | Moller | Sept. 22, 1942 |
| 2,677,038 | Reynoldson | Apr. 27, 1954 |
| 2,677,387 | Crawford | May 4, 1954 |
| 2,931,325 | Thelander et al. | Apr. 5, 1960 |
| 2,974,963 | McBride | Mar. 14, 1961 |

FOREIGN PATENTS

| | | |
|---|---|---|
| 59,288 | Norway | Apr. 25, 1938 |